United States Patent [19]

Rösler

[11] 4,078,452
[45] Mar. 14, 1978

[54] DRIVE SYSTEMS FOR MINING APPARATUS

[75] Inventor: Wulff Rösler, Lunen, Germany

[73] Assignee: Gewerkschaft Eisenhutte Westfalia, Westfalia, Germany

[21] Appl. No.: 641,322

[22] Filed: Dec. 16, 1975

[30] Foreign Application Priority Data

Dec. 19, 1974 Germany .............................. 2460098

[51] Int. Cl.² ............................................. F16H 3/74
[52] U.S. Cl. ............................................. 74/752 C
[58] Field of Search ................. 74/862, 785, 786, 626, 74/752 C

[56] References Cited

U.S. PATENT DOCUMENTS

| | | | |
|---|---|---|---|
| 2,191,907 | 2/1940 | Filippis | 74/786 |
| 2,212,046 | 8/1940 | Ross | 74/786 |
| 2,377,199 | 5/1945 | Adams et al. | 74/786 X |
| 2,588,952 | 3/1952 | Baisch | 74/786 X |
| 2,890,604 | 6/1959 | Campbell, Jr. | 74/752 C |
| 2,891,423 | 6/1959 | Connell et al. | 74/786 |
| 3,240,083 | 3/1966 | Stoddard | 74/786 X |
| 3,563,113 | 2/1971 | Harvey | 74/786 |
| 3,851,547 | 12/1974 | Piret et al. | 74/752 C X |

*Primary Examiner*—Samuel Scott
*Assistant Examiner*—Lance W. Chandler
*Attorney, Agent, or Firm*—Sughrue, Rothwell, Mion, Zinn and Macpeak

[57] ABSTRACT

A drive system, particularly for mining apparatus employing chains, which has a fluid control circuit coupled to a ring gear of planetary gearing transmitting drive from a motor. The control circuit has a pump drivably coupled to the ring gear and the fluid outlet from the pump can be blocked to lock the ring gear and permit transmission of force through the planetary gearing. In the event of abnormal loading the outlet from the pump is opened automatically to allow fluid to flow at a pre-determined flow rate. This in turn allows the ring gear to rotate to break the transmission and the system can be gently braked without danger.

16 Claims, 3 Drawing Figures

DRIVE SYSTEMS FOR MINING APPARATUS

BACKGROUND OF THE INVENTION

The present invention relates to a drive system particularly, but not solely, for use with mining apparatus and especially chain-driven mining apparatus.

Mining apparatus employing driven chains, such as coal ploughs or scraper-chain conveyors, usually require high performance drive means with electric or hydraulic motors and reduction gearing. It is common to provide safety devices such as shear pins to preclude damage in the case of abnormally high loads and to prevent breakage of the chain or chains. In the event of fracture of a shear pin the sudden release of loading may often cause a highly-tensioned chain to whip or spring-back with resultant danger to personnel. Usually the gearing needs to provide a transmission ratio in the order of 16:1 and a two stage gearing would be appropriate. However in order to accommodate the shear pin it has been necessary to provide an extra stage and the resultant three-stage gearing has meant a relatively large and heavy unit. Another requirement of the drive means is for the direction of drive to be reversible and for there to be some control of speed. The latter is particularly desirable with a plough. In certain circumstances it is often necessary to control the tension in the chain and hitherto a variety of special ancillary devices have been constructed for this purpose.

With regard to the foregoing a general object of this invention is to provide an improved form of drive system.

SUMMARY OF THE INVENTION

In its broadest aspect, the invention provides a drive system for use with mining apparatus; said drive system comprising drive means for driving the apparatus through gearing and hydraulic control means operable to automatically interrupt transmission through the gearing whenever the load thereon exceeds a predetermined value. The hydraulic circuit can thus act as a safety device and it is advantageous to make the circuit act as a brake to control the energy in the system and avoid the problems discussed hereinbefore.

According to the invention the drive system may comprise electric drive means, a gearing unit for transmitting drive from the drive means and hydraulic control means composed of at least one pump and an associated hydraulic circuit, the pump being operated by the gearing unit and at least part of the hydraulic circuit being settable to a locked state permitting the transmission of drive through the gearing unit or an unlocked state where pressure fluid passes through a throttle device to interrupt the transmission of drive through the gearing unit and to exert a controlled braking effect on the drive system. Although the term throttle device is used here other analogous means can also be employed.

It is preferable for the gearing unit to have two stages; a first or input stage being in the form of planetary gearing. This planetary gearing can then have planet wheels drivably connected to a sun wheel driven by the drive means or motor and to a ring gear which is drivably coupled to the pump. The fluid circuit can then block the fluid feed from the pump to thereby hold the ring gear to permit the transmission of drive through the gearing unit or to permit a controlled flow of fluid to release the ring gear and allow the transmission to be safely cut off in the event of an abnormally high load on the system. The planet wheels may be mounted to a common carrier which connects with a shaft forming the input to the second or output gearing stage.

In order to couple the pump to the ring gear the latter component may have teeth on its inside engaging with the planet wheels and teeth on its outside engaging with a pinion for driving the pump. To locate and center the ring gear additional freely-rotating pinions can engage with the external teeth so that the ring gear is disposed between the pinions and the planet wheels.

The hydraulic or fluid circuit may include a valve device arranged to connect the pump outlet through the throttle device to a fluid reservoir to bring the circuit into the unlocked state and to break the connection to bring the circuit into the locked state.

To ensure that this device automatically changes over to connect the pump with the throttle device or its equivalent to thereby permit the ring gear to rotate and cut off transmission, it is preferred to utilize sensing means in the form of a pressure-relief valve which is actuated when the pressure at the inlet of the valve device rises above a pre-determined level indicating an abnormal load. This pressure-relief valve can act on a control piston of the valve device which itself acts against the restoring force of a spring so that the valve device will revert to its former state to disconnect the pump from the throttle device to hold the ring gear stationary when the pressure falls below the setting pressure of the pressure-relief valve. When the transmission is cut-off, by permitting the ring gear to rotate, the controlled flow of fluid through the throttle device or its equivalent will safety dissipate the kinetic energy of the system over a short time period thus gently braking the system and ensuring there is a selected minimal tension in any chain driven by the system to preclude the chain from springing back. The hydraulic control is also useful in ensuring a smooth start-up of the drive system since the fluid acts as a damping medium having a certain elasticity. An accumulator can be provided to enhance this affect if desired.

A pressure switch actuated by the pressure-relief valve can separately generate a control signal, electric or hydraulic, used to halt the drive means or motor and preferably this signal acts to automatically halt the drive means.

It is preferable to make the system reversible so that drive can take place in either of two directions. To ensure that the hydraulic control can cope with any reversal, it is preferable to provide a two-state reversing valve device which is actuated automatically to connect the prevailing feed outlet of the pump to the main valve device.

To provide more versatility to the system the main valve device can have a separate control, which may be electromagnetic, permitting it to change state upon application of an external signal. This permits an operator to control the motor of a plough for instance propelled by a chain driven by the drive system although this can be achieved automatically. The throttle device can also be adjustable to permit controlled retardation of the plough or other apparatus. These features also permit control of tension in a chain for certain operations.

In some circumstances, such as chain tensioning, it may be desirable to utilize the pump as a motor. This would require some means to lock the sun wheel of the planetary gearing either directly or through the output shaft of the electric drive motor and an external source of pressure fluid used to operate the pump as a motor.

In this case the ring gear rotates to drive the planet wheels, and hence their carrier, around the sun wheel.

The invention also provides a drive system for mining apparatus; said system comprising a motor, reduction gearing connected with the motor and having a component which can be locked to permit transmission through the gearing or unlocked to break such transmission, a fluid pump drivably coupled to said component of the gearing, fluid circuit means settable to a first condition to block the flow of fluid from the pump and thereby lock said component on to a second condition to allow fluid flow from said pump to unlock said component and sensing means which automatically brings the circuit means into its second condition when the load on the gearing exceeds a predetermined value.

The invention may be understood more readily, and various other features of the invention may become apparent, from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT.

Figure 1:
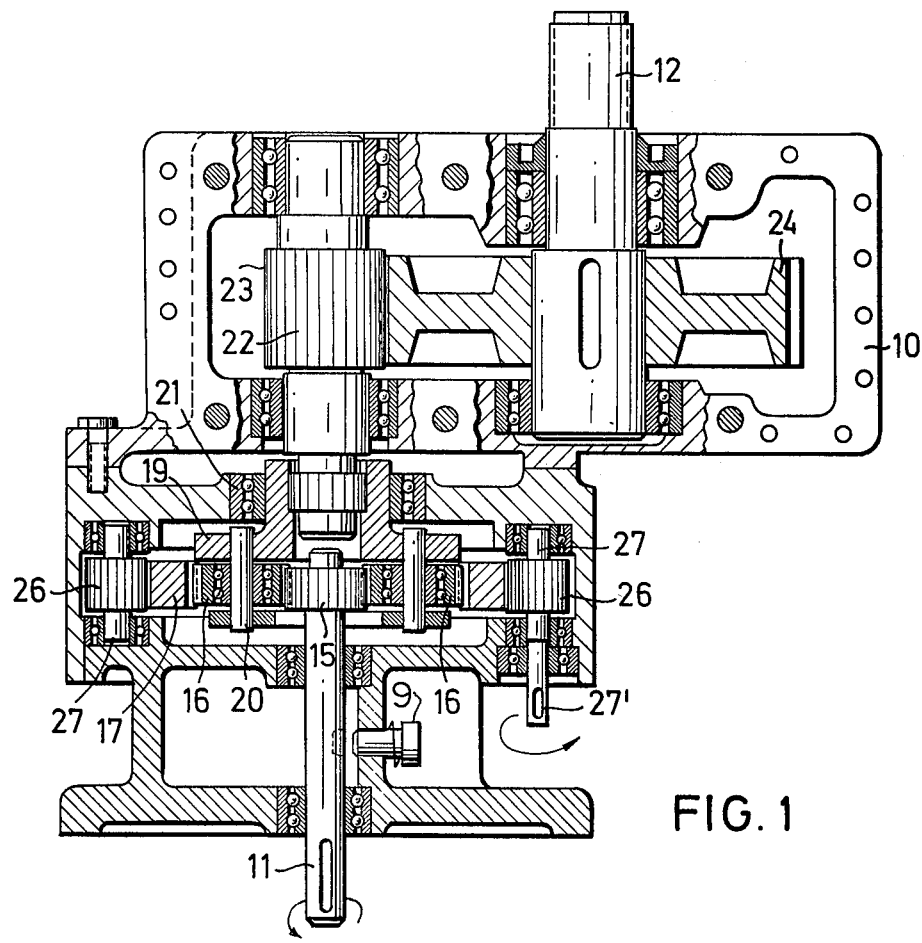
FIG. 1 is a part sectional view of a gearing unit of a drive system made in accordance with the invention.
Figure 2:
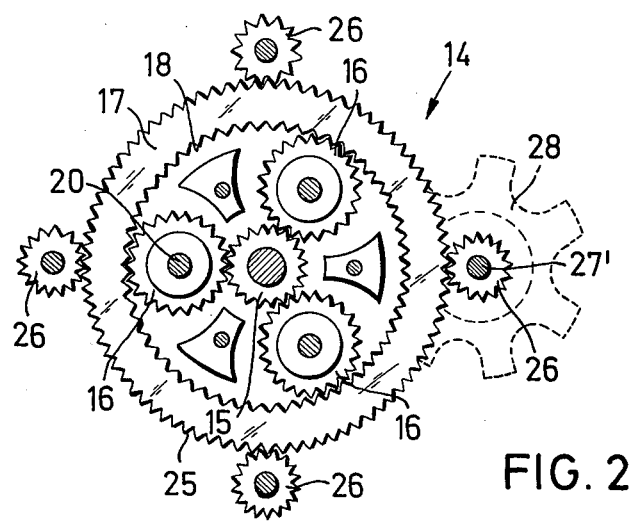
FIG. 2 is a schematic representation of part of the gearing unit shown in FIG. 1.

As shown in FIG. 1 of the drawings, the drive system employs a gearing unit generally designated 10 which has two housings secured together as depicted. An input shaft 11 extends into one of the housings, conveniently designated the input housing, while an output shaft 12 extends out from the other of the housings, conveniently designated the output housing. The input shaft 11 is rotatably supported by a bearing in a wall of the input housing and is driven by means of a reversible electric motor represented by numeral 13 in FIG. 3. The output shaft 12 is likewise rotatably supported by bearings in walls of the output housing and is coupled normally to a component of some mining apparatus (not shown) and particularly to a chain driving wheel or drum. Referring now to FIGS. 1 and 2, the shafts 11, 12 are interconnected through gearing which has an input or first stage in the form of a planetary gear train 14 disposed in the input housing and an output or second stage disposed in the output housing. This planetry gearing 14 comprises a sun wheel 15, planet wheels 16 and a ring gear 17. The sun wheel 15 is rotatably fixed to the shaft 11 and the planet wheels 16, which mesh with the sun wheel 15, are supported by a common carrier 19 with the aid of spindles 20. The wheels 16 are mounted to the spindles 20 with the aid of bearings which permit the free rotation of the wheels 16. The ring gear 17, which surrounds the planet wheels 16, is in the form of a ring or annulus provided with teeth on its interior periphery and on its exterior periphery as represented by the numerals 18, 25, respectively. The interior periphery teeth 18 mesh with the wheels 16.

The carrier 19 forms a sleeve through which the shaft 11 extends and the carrier 19 is rotatably supported by a bearing 21 in a wall of the input housing. A further intermediate shaft 22 is disposed coaxially with the shaft 11 and is rotatably fixed to the carrier 19. This shaft 22 extends into the output housing and is itself rotatably supported by bearings in the aforementioned walls of the output housing. During the assembly of the gearing unit the carrier 19 would be accurately mounted on the shaft 20.

A gear wheel 23 is secured to the shaft 22 and meshes with a spur gear 24 of somewhat greater diameter providing a reduction ratio. The spur gear 24 is itself secured to the output shaft 12.

As already mentioned the ring gear 17 of the planetary gearing 14 has teeth 25 on its external periphery and a number of pinions 26, in this example four, mesh with these teeth 25. Each pinion 26 is secured to a spindle 27 which is rotatably supported by bearings in the main walls of input housing. Thus the ring gear 17 is effectively located and supported by the pinions 26 and the gear wheels 16 while the planet wheels 16 center and align the sun wheel 15 and the ring gear 17. The spindle 27 of at least one of the pinions 26 is somewhat longer than the others and has a portion 27' projecting out from the input housing. This prolonged spindle 27, 27' drivably engages with a fluid pump, represented by number 28 in FIG. 3, and forms a drive shaft therefore. As described hereinafter the pump 28 is connected with a fluid circuit which constitutes a means for controlling the operation of the gearing unit. In general, where the pressure feed from the pump 28 is open the ring gear 17 can rotate to rotate the pinions 26 and more especially the pump drive shaft 27, 27'. In this case when the shaft 11 is driven the sun wheel 15 rotates the planet gears 16 and the ring gear 17 but the carrier 19 remains stationary so no drive is transmitted via the output gearing 23, 24 to the shaft 12. Conversely, where the pressure feed from the pump 28 is blocked the back pressure on the pump 28 will prevent the rotation of its drive shaft 27, 27'. In this condition the pinion 26 supported on the prolonged spindle 27, 27' will lock the ring gear 27 so that the planet wheels 16 now impart drive to the carrier 19 which rotates as the sun wheel 15 is rotated by the shaft 11. Thus, transmission of drive to the shaft 12 can take place.

Figure 3:
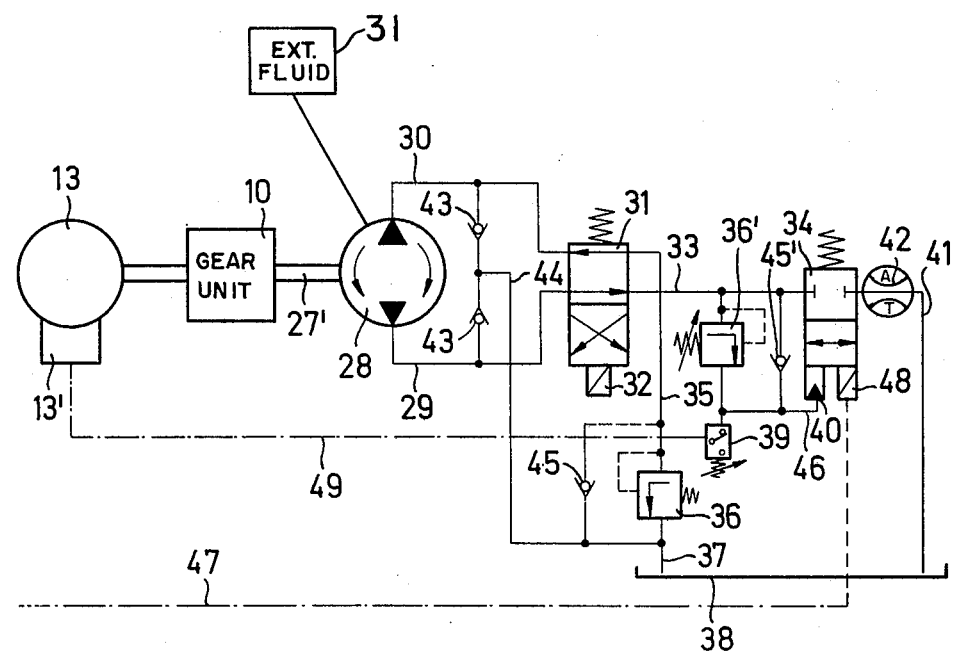
FIG. 3 is a diagrammatic representation of the complete drive system and showing particularly the hydraulic circuit thereof.

The complete hydraulic circuit pertaining to the pump 28 will now be described with reference to FIG. 3. The circuit may utilize a hydraulic or a pneumatic pressure fluid medium although for convenience only hydraulic fluid will be referred to hereinafter. In FIG. 3, the various connections or pressure fluid lines are depicted as full lines and in practice these lines may be in the form of pipes or conduits or alternatively channels or bores or the like in a unitary housing accommodating the various devices depicted. The latter form of construction may be preferred since it would allow the housing containing the hydraulic circuit to be easily connected to the gearing unit 10. In any event for convenience all forms of the connections will be referred to as lines. As shown in FIG. 3, the pump 28 is connected to the lines 29, 30 one of which will form the outlet or pressure feed line and the other of which will form the inlet or fluid return line. The lines 29, 30 connect with two inlets to a reversing valve device 31 which can be set to one or two alternative connection states as represented by the arrows. The device 31 has a trigger input 32 which is energized electromagnetically against the force of a spring to cause the device 31 to change state. The device 31 has two outlets each of which is connected to one or other of the lines 29, 30. These outputs are respectively connected to a main shut-off valve device 34 via a line 33 and to a pressure-relief valve 36 via a line 35. During operation the line 33 will always be the pressure line and the line 35 will always be the return or suction line. The device 34 has two alternative states as represented in the drawing and namely a connection state or a disconnected or blocked state.

The device 34 has an outlet which is either connected to or disconnected from the line 33, depending upon the state of the device 34, and this outlet is connected via an adjustable throttle device 42 and a line 41 to a pressure fluid reservoir 38. The adjustable throttle device 42 could be replaced by some analogous device or unit performing a similar function. The valve 36 also has its outlet connected via a line 37 to the reservoir and connection is only established between the lines 35, 37 if the pressure in the line 35 exceeds a pre-determined value.

A further pressure-relief valve 36' has its inlet connected to the line 33 and its outlet connected via a line 46 to a control or servo piston 40 of the device 34. When the lines 33, 46 are connected via the device 36', and this only occurs when the pressure in the line 33 exceeds a predetermined value, the piston 40 actuates the device 34 to its connective state, establishing connection between the lines 33, 41 against the restoring force of a spring. The device 34 also has an electromagnetically operated trigger 48, analogous to the trigger 32 of the valve device 31. This trigger 48 when actuated, performs the same function as the servo-piston 40 to bring the device 34 into its connective state. An electric control signal can be fed to the trigger input 48 via a conductor 47.

A pressure-sensitive switch 39 is connected to the line 46 so that when the servo piston 40 is operated the device 39 is also activated to produce a control signal, which is preferably electric, although it can be hydraulic. This signal is routed via a line or conductor 49 directly or indirectly to a control unit 13' of the motor 13.

Two non-return valves 43 are connected to the lines 29, 30 and arranged to open in opposite directions as shown. The outlets from these valves 43 are connected in common via a line 44 to the reservoir 38. Further non-return valves 45, 45' are connected, respectively, between the lines 35, 44 and 33, 46 as shown.

Although not illustrated in FIG. 3, the trigger 32 for the valve device 31 is connected into the motor control circuit so that whatever direction of rotation of the motor drive shaft 11 the pressure feed from the pump 28 is connected to the valve device 34 and the return or suction line is connected to the reservoir 38. This is accomplished by the valve device 31. Thus, as illustrated the line 29 is the pressure line connected through the device 31 to the line 33 whereas the return line 30 is connected via the valve device 31 to the line 35 and hence through the non-return valve 45 to the reservoir 38. The reversal of the motor 13 will automatically actuate the valve device 31 through the trigger 32 to maintain the position with the new pressure line 30 connected to the line 33 and the new return line 29 connected to the line 35. The valves 36, 38' are set to actuate at a certain pre-determined safety pressure commensurate with the maximum permissible force or torque on the shaft 11. Where a conventional form of chain-driven mining apparatus is powered by the system the valves 36, 36' can replace the known form of shear pins designed to protect the chain or some other component of the apparatus. It is desirable to make the actuating pressure of the valves 36, 36' adjustable.

With chain-driven mining apparatus especially with scraper-chain conveyors it is known to provide two drive stations, i.e. the so-called main and auxiliary drive stations and in such cases is may be preferred to provide two drive systems as described for the main and auxiliary drive stations.

Instead of using just one pinion 26 as a drive means for a single pump 28 it is possible to have a number of pumps each driven by the spindle of one of the pinions 26. Each of these pumps can have its own hydraulic circuit or else a common hydraulic circuit can be provided for all the pumps.

In a further possible modification, to avoid the need for the teeth 25 on the exterior periphery of the ring gear 17 the pump or pumps 28 can be driven by spur gears or pinions also meshing with the teeth 18 on the interior periphery of the ring gear 17.

The operation of the complete arrangement or system as illustrated is as follows:

Assuming that the motor 13 starts up with the shaft 11 rotating clockwise the line 29 is the pressure line and the return line 30 can take in fluid from the reservoir 38 via the valves 43, 45. The situation is thus as represented in FIG. 3. Since the valve device 34 blocks connection between the lines 33, 41 the outlet from the pump 28 is locked in the hydraulic sense. This prevents rotation of the ring gear 17 as described above and drive is established between the shafts 11, 12. As the hydraulic pressure fluid provides a measure of elasticity, when the motor 13 starts up the ring gear 17 will partly rotate until the motor 13 builds up to full speed. This provides for a smooth and gradual increase in the available torque at the shaft 12 and where a chain or chains are employed this is advantageous in gradually increasing the tension in the chain or chains. If desirable the elasticity of the hydraulic circuit can be increased by employing additional throttles or an accumulator connected in the line 33. Any electrical surges in the motor control circuit can also be damped in this way. The drive system is now operative and in the condition where the mining apparatus, especially a coal plough, becomes jammed or otherwise develops a fault leading to a sudden increased load on the shaft 12 the torque on the ring gear 17 increases. The pressure at the outlet of the pump 28 now rises rapidly until the valve 36' actuates to permit the pressure fluid to act on the servo-piston 40. In this way the device 34 changes state to establish connection between the lines 33, 41, thereby relieving the pressure in the line 33 and permitting the pressure fluid to discharge into the reservoir 38 via the throttle device 42. When the valve 36' is actuated the pressure in the line 46 also acts on the switch 39 and initiates the signal on conductor or line 49 which signal serves to switch off the motor 13. As the pressure falls in the line 33 the pump 28 is released so that the ring gear 17 is allowed to rotate to drive the pinions 26. Thus the transmission of drive force to the shaft 12 is gradually cut-off and as the motor 13 runs down the pressure fluid gently brakes the drive system.

Once again this ensures that the drive force is not cut off instantaneously precluding any rapid and possibly dangerous reduction of tension in the chain. Indeed the system maintains a certain safe tension in the chain and precludes any springing back of the chain. When the pressure in the line 29 falls below the setting pressure for the valve 36′ the latter opens again and the fluid in the line 46 flows back into the line 33 via the valve 45′. As a result of the restoring force of its spring the valve device 34 resets to close connection between the line 33, 41 since there is no longer any pressure acting on the piston 40. This again locks the pump 28 so that drive can take place again. When the device 36′ opens and the fluid in the line 46 discharges, the switch 39 is deactivated and the inhibiting signal on the line or conductor 49 is removed permitting the motor 13 to start up again. This can be effected automatically or it may be more desirable to require this to be done manually to ensure that the fault is cured.

If the motor 13 is operated so that the shaft 11 rotates anti-clockwise the pump 28 operates in a reverse sense so that the line 30 is now the pressure line. When this happens it is arranged for the valve device 31 to be changed over automatically by the signal at its trigger 32. The pump 28 now takes in fluid from the reservoir 38 via the line 29 and the valves 43, 45 and the pressure line 30 is connected to the line 33 and hence to the device 34. Apart from these changes the operation is as described hereinbefore.

In certain circumstances where a fault develops it may be that the shaft 12 is made to rotate in the reverse direction to that in which it is being driven. Assuming the situation is as illustrated in FIG. 3, the line 30 will now become the pressure line as the pump 28 is operated in the reverse sense. In this unusual circumstance the hydraulic system acts as a recoil brake and the pump 28 will draw in fluid from the reservoir 38 via the lines 29, 44 and the valve 43 and will discharge the fluid back to the reservoir 38 via the valve device 36.

It will be recalled that the device 34 also has the electromagnetic trigger 48 which enables the hydraulic circuit to cut off the transmission between the shafts 11, 12. This is a useful faciliity since when the mining apparatus is a chain-driven coal plough the drive to the chain can be cut off when the plough is at a certain distance from the end of the mine working by means of a signal on the conductor 47. This signal can be initiated by an operator or automatically by some appropriate switch means. It can also be arranged for the electric motor 13 to be switched off by this switch means or otherwise, so that once again the kinetic energy of the drive system and the mining apparatus can be gently run down by the fluid flowing through the throttle device 42. Thereafter, the motor 13 can be started up again and the signal on the conductor 47 removed to bring the plough back in the reverse direction.

In certain circumstances where, for example, it is desired to slow the motion of the plough or where it is desired to control the tension in the drive chain or chains, a series of signals can be conveyed by the conductor 47 to the trigger 48 to alternately connect and disconnect the lines 33, 41. In this case some of the energy provided by the motor 13 is dissipated as the ring gear 17 is successively released and locked.

Where drive systems of the type described are provided at the main and auxiliary drive stations then a series of signals on the conductor 47 of the drive system at the station drawing the plough toward it would be applied to the associated trigger 48. In the case of the drive system at the other drive station a constant signal can be applied to the trigger 48 of the valve device 34 so that the pump 28 can rotate freely thereby ensuring that there is practically no drag on the chain. Alternatively by adjusting the throttle device 42 a certain drag can be created deliberately to assist in slowing down the plough or the drive chain.

As can be appreciated signals on the conductor 47 and the throttling of the fluid can also be used to control the tension in the drive chain in analogous manner. In the case where a chain needs to be lengthened or shortened, the drive system producing tension in the chain can be made to run continuously with the pump 28 thereof operating against a certain counter pressure which determines the tension in the chain. This can be achieved by providing a constant signal on the conductor 47 and by adjusting the throttle device 42 to permit a slow speed drive to take place. At the desired tension, the chain wheel, driven by the shaft 12, will come to a halt and can be locked with pawls or the like to enable adjustment of the chain to take place in safety.

It is also possible for chain tension or braking to be controlled purely hydraulically instead of by employing the motor 13 even passively. To this end the pump 28 or pumps 28 are operated as motors by feeding in an external supply of pressure fluid 31. This can easily be arranged without extensive modification of the system as described. In this mode of operation the sun wheel 15 is held fixed by means 9 and remains stationary while the rotating ring gear 17 driven by the motor or motors 13 drives the planet wheels 16 and hence the carrier 19.

I claim:

1. A drive system comprising electric drive means, a gearing unit for transmitting drive from the drive means and hydraulic control means composed of at least one pump coupled to the gearing unit and an associated hydraulic circuit having means settable to a locked state permitting transmission of drive through the gearing unit or to an unlocked state where pressure fluid passes through a throttle device to interrupt the transmission of drive and to exert a controlled braking effect on the drive system, wherein the gearing unit at least includes planetary gearing with a ring gear drivably coupled to the pump, the planetary gearing having a sun wheel carried by an input shaft drivably coupled to an output stage of the gearing unit, means for locking the sun wheel and means for feeding pressure fluid to the pump to cause the pump to act as a motor to rotate the ring gear and thereby drive the output stage of the gearing unit.

2. A drive system comprising electric drive means, a gearing unit for transmitting drive from the drive means and hydraulic control means composed of at least one pump coupled to the gearing unit and an associated hydraulic circuit at least part of which is settable to a locked state permitting transmission of drive through the gearing unit or to an unlocked state where pressure fluid passes through a throttle device to interrupt the transmission of drive and to exert a controlled braking effect on the drive system, wherein the hydraulic circuit includes a valve device arranged to connect the pump outlet through the throttle device to a fluid reservoir to bring the circuit into the unlocked state and to break the connection to bring the circuit into the locked state, and wherein the hydraulic circuit has a pressure relief valve means which automatically actuates the valve device to bring the circuit into its unlocked state when the load on the gearing unit exceeds a certain level and thereby produces a corresponding increase in the value of the pressure of the fluid in part of the hydraulic circuit.

3. A drive system according to claim 2, wherein the gearing unit at least includes planetary gearing with a ring gear drivably coupled to the pump so that in the locked state of the hydraulic circuit the ring gear is held stationary.

4. A drive system according to claim 3, wherein the planetary gearing has a sun wheel carried by an input shaft drivably coupled to the drive means and planet wheels mounted to a common carrier which is drivably coupled to an output stage of the gearing unit.

5. A drive system according to claim 4, wherein the ring gear has teeth on its inner periphery which drivably engage with the planet wheels and teeth on its outer periphery which drivably engage with at least one pinion drivably coupled to the pump.

6. A drive system according to claim 2, wherein the valve device is adapted to also be separately actuated by means of external control signals.

7. A drive system according to claim 2, wherein there is further provided a pressure-sensitive switch which is operated by said pressure-relief valve and which provides a signal used to switch off the electric drive means.

8. A drive system according to claim 2, wherein the electric drive means can provide drive in either of two rotory directions and the pump is reversible and wherein the hydraulic circuit also has a two-state valve device which is actuated automatically whenever the electric drive means changes its direction of driving to ensure the outlet from the pump is always connected to the first-mentioned valve device.

9. A drive system according to claim 2, wherein a reservoir is operatively connected with the outlet from the pump.

10. A drive system according to claim 2, wherein the throttle device is adjustable.

11. A drive system according to claim 2, wherein the valve device has an outlet connected through the throttle device to said reservoir, an inlet connected to the pump feed outlet and a control piston operable by pressure fluid to connect the outlet and inlet together against the restoring force of a spring which biases the valve device into a condition where the inlet and outlet are disconnected and wherein a pressure relief valve has an inlet connected to the inlet of said valve device and an outlet connected to the control piston thereof.

12. A drive system according to claim 11, wherein the valve device also has an electromagnetic trigger input serving to receive an electrical control signal which when present connects the inlet and outlet of the valve device together against the restoring force of the spring.

13. A drive system according to claim 11, wherein a non-return valve is connected between the inlet and outlet of the pressure-relief valve and opens in a direction from said outlet to said inlet.

14. A drive system according to claim 11, and further comprising a two-state reversing valve device having first and second inlets connected respectively to the inlet to and outlet from the pump, a first outlet is connected with the reservoir, a second outlet is connected to the inlet of the first-mentioned valve device and a control input which serves to alter the state of the valve device in dependence on the rotary direction of the drive at the input of the gearing unit, whereby in one state the first inlet is connected to the first outlet and the second inlet is connected to the second outlet and in a second state the first inlet is connected to the second outlet and the second inlet is connected to the first outlet.

15. A drive system according to claim 14, wherein a further pressure-relief valve is connected between the first outlet of the reversing valve device and the reservoir and a non-return valve is connected across this further valve and opens in a direction from the reservoir, wherein the pump inlet and outlet are each connected through a non-return valve, to the reservoir, each valve opening in a direction from the reservoir.

16. A drive system according to claim 4 and further comprising means for locking the sun wheel and means for feeding pressure fluid to said pump to cause the latter to act as a motor to rotate the ring gear and thereby drive the output stage of the gearing unit.

* * * * *